Jan. 25, 1927. 1,615,328
F. FEWINS
HAIR CUTTER
Filed Jan. 2, 1925 5 Sheets-Sheet 1

INVENTOR:
Frank Fewins,
By R. S. Berry
ATTORNEY.

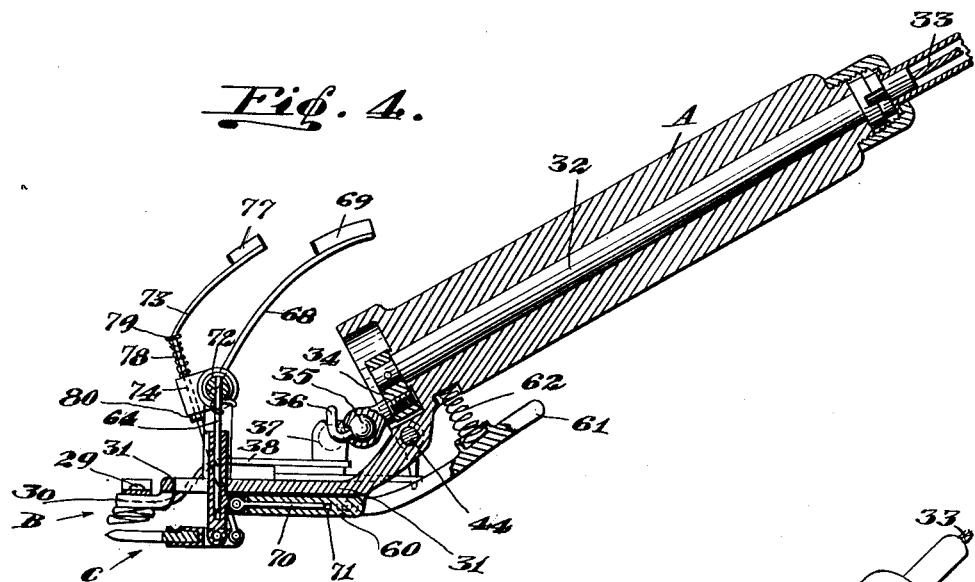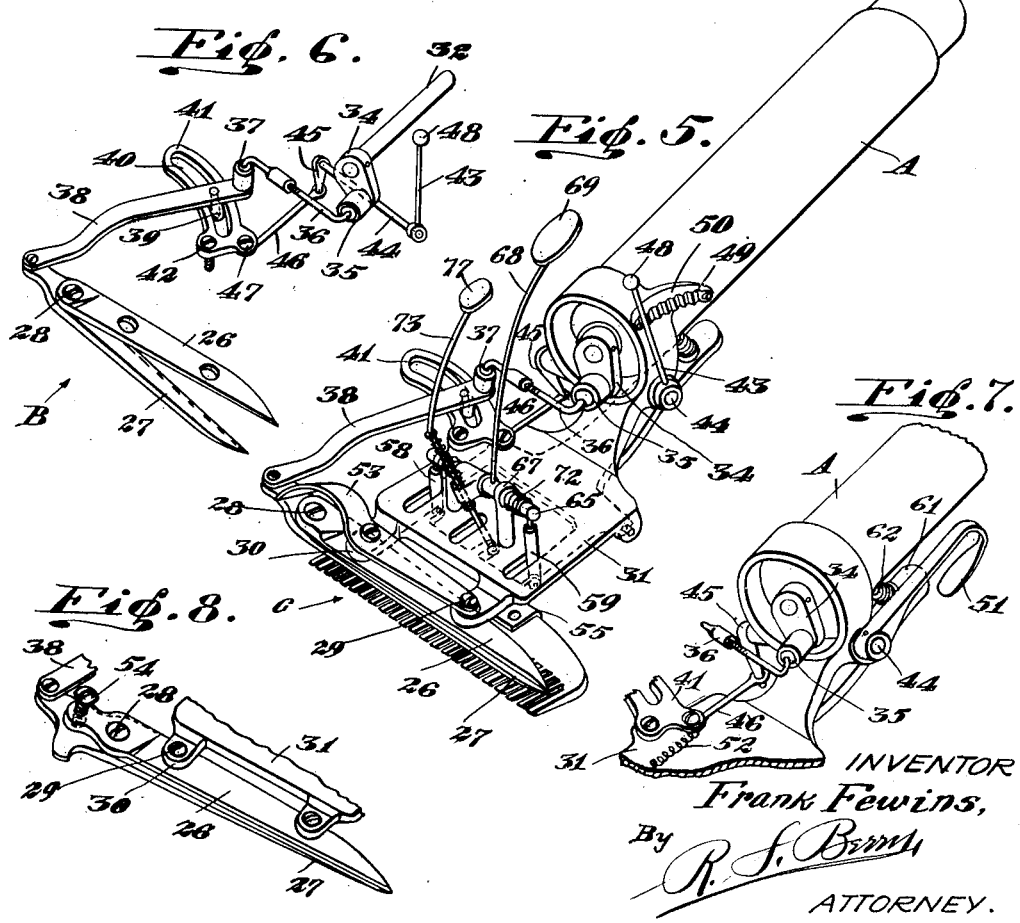

Jan. 25, 1927. 1,615,328
F. FEWINS
HAIR CUTTER
Filed Jan. 2, 1925   5 Sheets-Sheet 3

INVENTOR:
Frank Fewins,
By R. S. Berry
ATTORNEY.

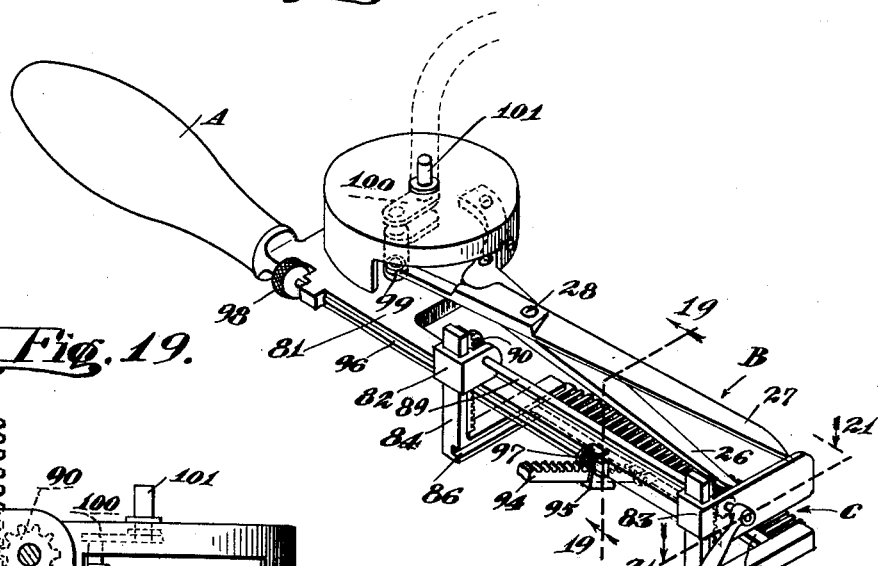
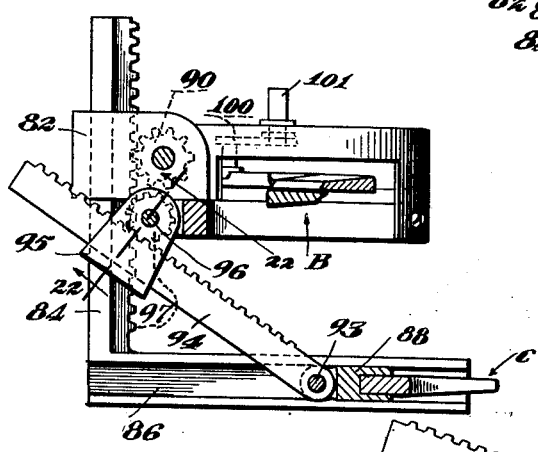
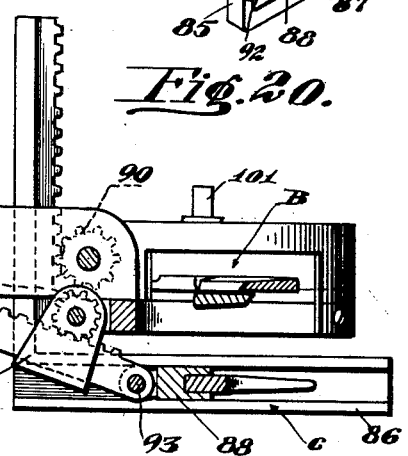
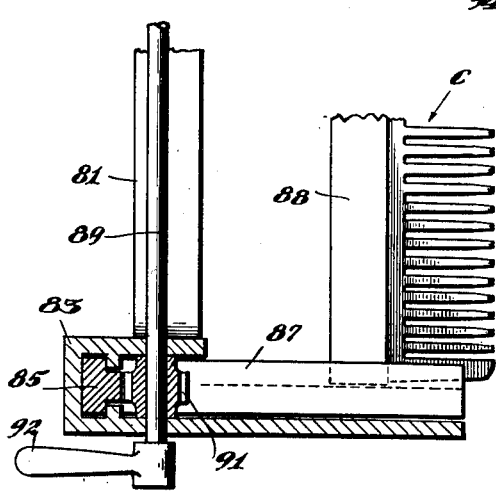
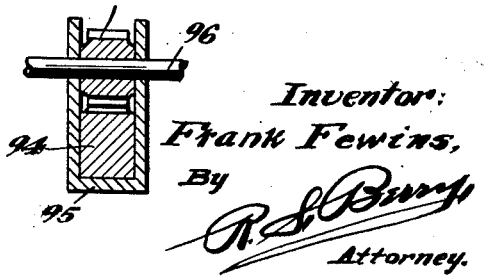

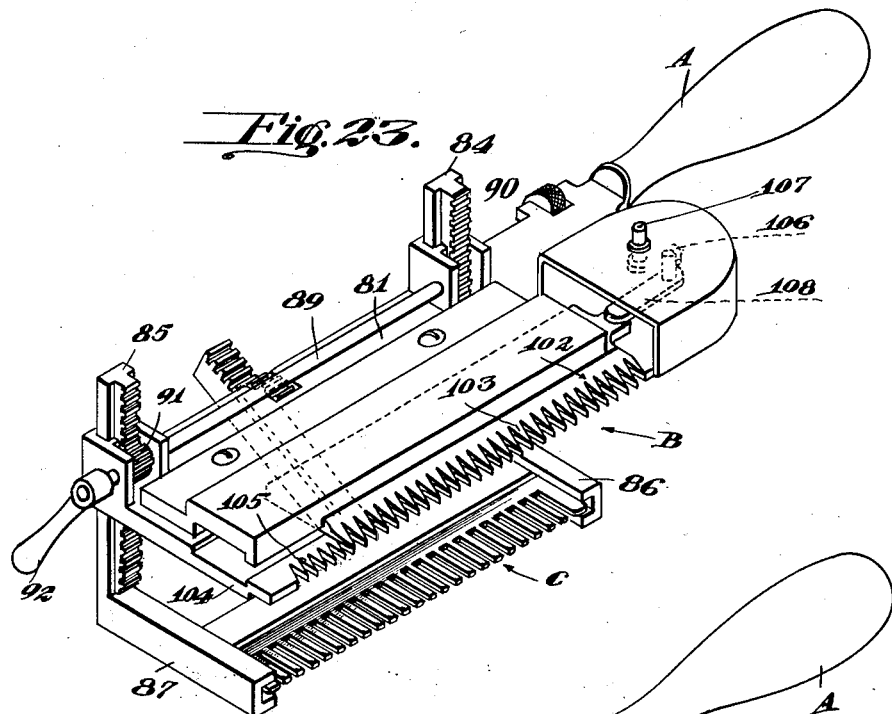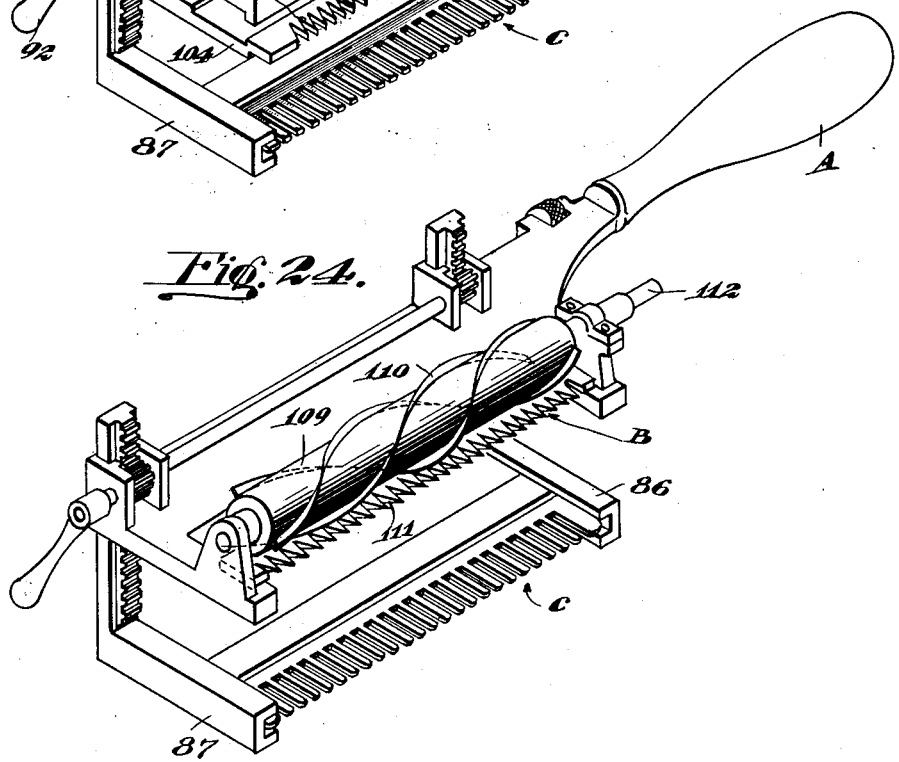

Patented Jan. 25, 1927.                                        1,615,328

UNITED STATES PATENT OFFICE.

FRANK FEWINS, OF LOS ANGELES, CALIFORNIA.

HAIR CUTTER.

Application filed January 2, 1925. Serial No. 43.

This invention particularly pertains to a mechanism for cutting hair in barbering operations.

An object of this invention is to provide a power driven hair cutting machine which is adapted to be used by barbers and the like in lieu of the manually operated shears and comb now generally employed, which is adapted to be so operated and controlled as to accomplish substantially all the hair cutting operations now done by hand, and whereby cutting and trimming of hair may be effected with greater speed and accuracy than with the present hair cutting implements.

Another object is to provide a hair cutting mechanism which embodies a comb and a power actuated cutter adapted to be disposed in various positions in relation to each other, and including simple and effective means whereby the relative positioning of the comb and cutter may be readily accomplished at the will of the operator during the operation of the cutter.

The mode of carrying out the foregoing objects, as well as such objects, features and advantages of the invention as may subsequently appear, is hereinafter described, and is illustrated by way of example in the accompanying drawings in which the several views depict constructions and arrangements of elements and parts whereby the invention may be carried into effect.

Referring to the drawings the several views are as follows:—

Figures 1, 2, 3, 4 and 5 are respectively views in plan, side elevation, inverted plan, longitudinal section and perspective, showing a preferred embodiment of the invention;

Figure 6 is a detail in perspective of the cutter employed in the device shown in Figures 1 to 5 inclusive, and illustrating the cutter operating and adjusting mechanism;

Figure 7 is a detail in perspective illustrating a modified form of the cutter adjusting mechanism shown in Figure 6;

Figure 8 is a detail in perspective showing the manner of mounting the cutter and illustrating a modification of a cutter tensioning means;

Figure 9:
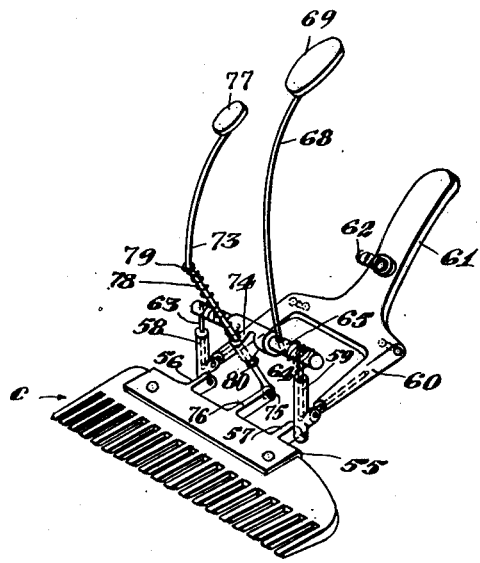
Figure 9 is a perspective view of the comb employed in the device shown in Figures 1 to 5 inclusive, and illustrating the manually operated control mechanism whereby the comb may be disposed in various positions in relation to the cutter.

Figures 11 to 17 inclusive, illustrate relative positions to the comb and cutter attained by manipulation of the manual control mechanism shown in Figure 9;

Figure 18 is a perspective view showing a modified form of the invention;

Figure 19 is a view in section and elevation as seen on the line 19—19 of Figure 18;

Figure 20 is a view similar to Figure 19 showing the parts in a different position;

Figure 21 is a detail in horizontal section and plan as seen on the line 21—21 of Figure 18;

Figure 22 is a detail in section as seen on the line 22—22 of Figure 19.

Figures 23 and 24 are views in perspective illustrating further embodiments of the invention.

Referring to the drawings more specifically, A indicates a handle on which is carried a power driven hair cutter B and an adjustable comb C. In the form of the invention illustrated in Figures 1 to 20 inclusive, the cutter is shown as comprising a pair of shear blades 26 and 27 pivotally connected together at 28 to have oscillatory movement in relation to each other; the blade 26 being preferably stationary or fixed with respect to the handle, and the blade 27 being mounted to swing or oscillate outwardly in relation to the fixed blade 26.

In the preferred construction the shear blades and handle are arranged to extend substantially at right angles to each other with the blades disposed transversely of the handle at one end thereof and with the handle projecting at an incline from the plane of travel of the movable shear blade, and the fixed blade is arranged above the movable blade being demountably attached by screws 29 to spaced lugs 30 projecting from the forward edge of a plate 31 carried by and extending from one end of the handle.

The power actuated transmission mechanism for operating the shears in the preferred construction embodies a rotary shaft 32 extending longitudinally through and journalled in the handle, which shaft may be rotated in any desired manner, being here shown as adapted to be connected at its outer end to a flexible shaft 33 driven from any suitable source of power such as an electric motor.

The inner end of the shaft is fitted with a crank 34 which is attached by a ball and socket connection 35 to a connecting rod 36 the outer end of which is attached by a ball and socket joint 37 to a slide link 38 connecting with the movable shear blade 27. The link is provided with a knobbed projection 39 on its underside and near the end thereof to which the connecting rod is attached, and which projection extends through an arcuate slot 40 formed in a normally stationary arm 41 carried on the handle plate 31. The link 38 extends at an angle to the connecting rod 36 and to the shear blade 27 and on rotation of the crank is caused to be reciprocated both laterally and longitudinally; lateral movement being imparted to the link by the action of the crank and connecting rod and longitudinal movement being effected by the action of the slotted arm 41 so as to impart an oscillatory motor to the shear blade 27. In order to cause the link to move lengthwise on being reciprocated laterally, the arcuate slot 40 is disposed so that the side margins thereof will extend generally in inclined relation to the direction of length of the link and form inclined planes along which the projection 39 rides under the action of the crank and connecting rod. The ball and socket connections between the connecting rod and the crank and link serve to permit the lateral and vertical swinging movement of the connecting rod in relation to the crank and link during the driving operation of the cutter. The arm 41 is mounted to swing on a pivot pin 42 carried by the plate 31 and is adapted to be disposed in various positions so as to change the relative inclination of the slot 40 whereby the length of stroke of the shear blade may be varied as occasion may require. This positioning of the slotted arm 41 may be accomplished in any desired manner being here shown in Figures 1 to 6 inclusive, as effected by means of a lever 43 attached to and extending upwardly from a rock shaft 44 extending transversely beneath the handle A and journalled in a suitable bearing on the latter; the rock shaft 44 carrying a crank 45 attached to a connecting rod 46 leading to and pivotally connecting with the slotted arm 41 adjacent the pivotal mounting 42 of the latter as indicated at 47. The lever 43 extends upwardly alongside the handle A and has a knob 48 on its upper end so positioned that it may be engaged by the thumb of the operator to effect shifting of the lever 43 into various positions. The lever 43 is adapted to spring into engageon a serrated plate 50 carried on the side of the handle A in such manner as to retain the lever 43 in various positions; the notches 49 being formed with inclined side walls so that the lever 43 may readily ride from one notch to another. By this arrangement the slotted arm 41 may be set and normally retained in various positions.

In the modified form of the adjustment of the slotted arm shown in Figure 7, the rock shaft 44 is fitted with a lever 51 which extends substantially longitudinally of the handle A in such position that it may be moved by one of the fingers of the operator to actuate the rock shaft 44 to dispose the slotted arm 41 in the desired position; a spring 52 being provided to maintain the slotted arm in a normal position and adapted to yieldably oppose movement of the arm under the action of the lever 51 and also serving to restore the arm to normal. By this arrangement the variations in the length of the stroke of the shear is controlled by variable manual pressure applied to the lever 51.

It is desirable that the shear blades 26 and 27 be maintained in contact under tension and for this purpose a bowed plate spring 53 is mounted on the plate 31 and attached to the latter by screws 29; this plate spring bearing on the portion of the shear blade 27 projecting to the side of the pivot 28 opposite the cutting edge of the shear as particularly shown in Figures 1 to 5, thereby exerting such yieldable pressure on the inner end portion of the shear blade 27 as to cause the cutting end portion thereof to bear upwardly against the underside of the fixed shear blade 26. This action may also be accomplished by the construction shown in Figure 8 in which a set screw 54 threaded in the fixed shear blade is arranged to bear on the movable shear blade to one side of the pivot 28 so as to cause the outer cutting portion of the blade 27 to bear upwardly against the fixed blade. It will be understood that the pivotal connection between the shear blades is sufficiently loose to permit the slight vertical rocking of the shear blade 27 necessary to cause the blade 27 to bear under tension on the blade 26.

The comb C is arranged beneath the cutter with its teeth projecting outwardly in transverse relation thereto and is designed to be disposed in various positions relatively to the cutter under the manual control and at the will of the operator, and accordingly, it is mounted to have certain movements and is associated with manually operated control mechanism whereby it may be actuated.

Figure 10:
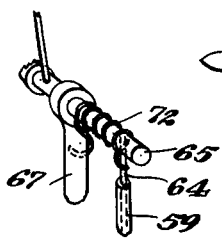
Figure 10 is a detail in perspective of a spring and associated parts for normally maintaining the comb in a retracted position.
Figure 14:
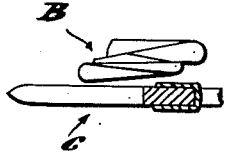
Figure 11:
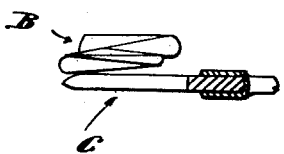

In the preferred form of the invention the comb is mounted as particularly shown in Figure 9, being carried on a back plate 55 fitted with a pair of spaced lugs 56 and 57 upwardly extending tubular sleeves 58 and 59 carried on a rocker yoke 60 which yoke in turn is pivotally supported on the underside of the handle plate 31. The yoke 60 is formed with a shank 61 which extends upwardly beneath the underside of the handle A and is adapted to be engaged by one of the fingers of the operator and manipulated to effect rocking movement of the yoke whereby the comb may be moved up and down in relation to the cutter; a spring 62 bearing between the handle and the shank yieldably opposing movement of the latter and acting to normally maintain the yoke in such position as to dispose the comb close to the underside of the cutter, as shown in Figures 4 and 11 and serving to yieldably oppose rocking movement of the yoke and acting to restore the comb to its normal uppermost position on release of the shank. The tubular sleeves 58 and 59 telescopically engage depending stems 63 and 64 carried on a rock shaft 65 journalled in a pair of standards 66 and 67 supported on the handle plate 31; the rock shaft 65 being fitted with an upwardly extending operating lever 68 carrying a finger piece 69 positioned convenient to the reach of the thumb of the operator whereby the rock shaft may be actuated and thereby impart a horizontal reciprocal movement to the comb. In order to permit the comb to move back and forth on operation of the rock shaft 65 the sleeves 58 and 59 are connected to the yoke 60 by means of a telescopic and pivotal connection comprising stems 70 which are pivotally attached to the sleeves and slidably extend into horizontal guideways 71 formed in the yoke 60 which allows the lower end portions of the comb carrying sleeves to move outwardly and inwardly in relation to the yoke and whereby on operation of the lever 68 the comb may be moved to a forward position as shown in Figure 14. The comb is designed to be normally maintained in the retracted position shown in Figure 11 and for this purpose springs 72 are wound on the rock shaft 65 and have their terminals engaging the standards 66 and 67 and the stems 63 and 64 as shown in Figure 10 and acting to exert a backward pressure on the latter and yieldably oppose outward movement of the comb, and also serves to restore the comb to its normal retracted position on release of the lever 68. It will now be seen that by manipulating both the shank 61 and the lever 68 the comb may be caused to move downwardly and forwardly in relation to the cutter to the position shown in Figure 15.

Figure 1:
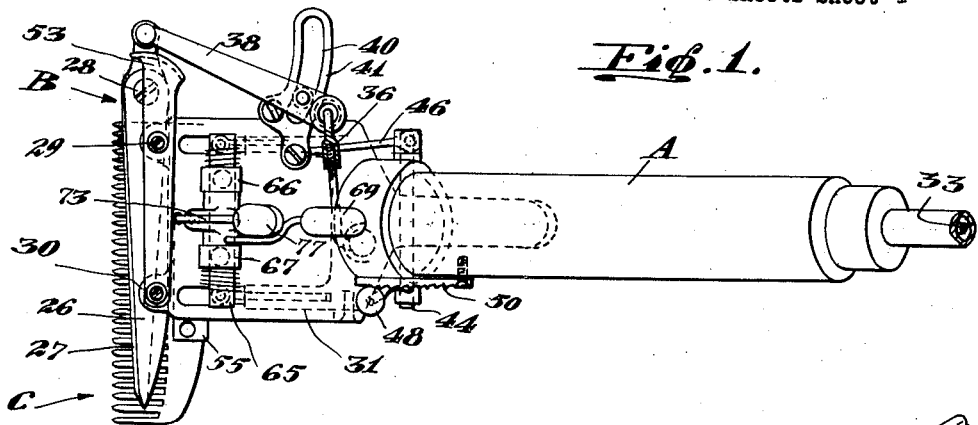
Figure 2:
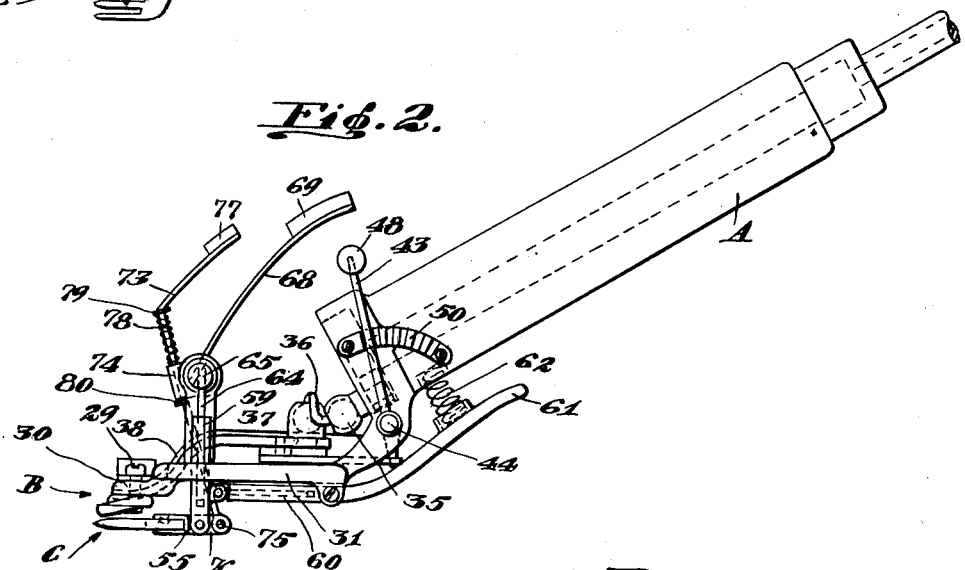
Figure 3:
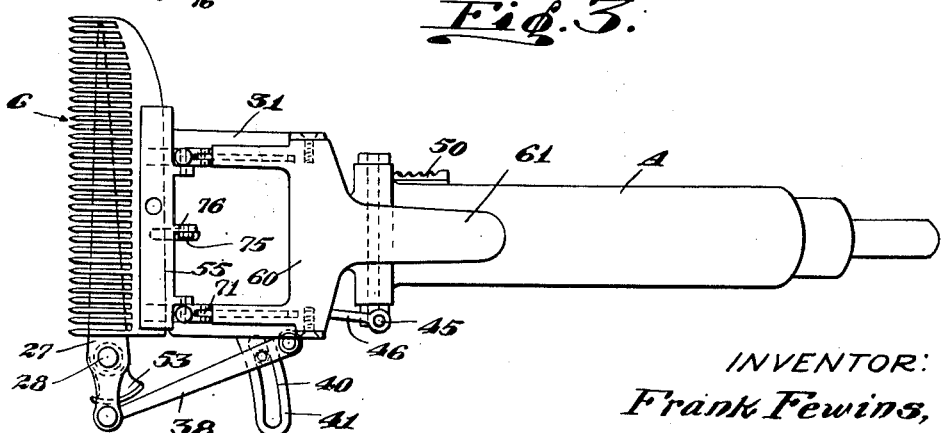
Figure 12:
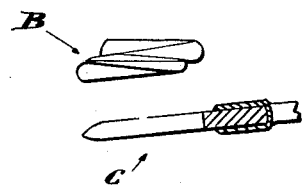
Figure 13:
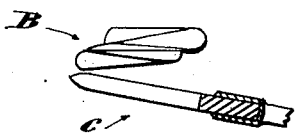
Figure 15:
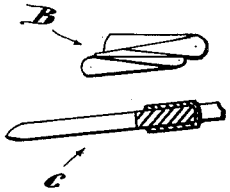
Figure 16:
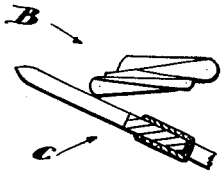
Figure 17:
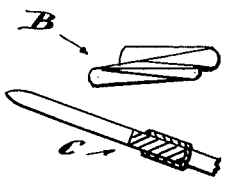

Means are also provided for tilting the comb relatively to the cutter while the comb is in either its normal retracted position (as shown in Figure 13) or in its advanced position (as shown in Figure 16), or in its lowered and advanced position (as shown in Figure 17). This means is here shown as embodying a push rod 73 mounted to slide longitudinally in a collar 74 fixed on the rock shaft 65; the push rod extending downwardly from above the rock shaft and having its lower end connected by a pivot pin 75 to a lug 76 projecting from the rear edge of the comb supported plate 55. The upper end portion of the push rod 73 is formed with a head 77 positioned forward of the finger piece 69 on the lever 68 and disposed so that it may be conveniently reached by the thumb of the operator to effect longitudinal reciprocal movement of the push rod 73 and thereby impart a rocking movement to the comb on its pivotal connections with the supporting sleeves. Means are provided for yieldably opposing rocking movement of the comb and for maintaining it in a normal position on its pivotal mounting and also for restoring the comb to its normal position on removing pressure from the head 77 of the rod 73, which means is here shown as comprising a spring 78 wound on the rod and bearing between the upper face of the collar 74 and a shoulder 79 on the rod. The action of the spring 78 on the rod is limited so that the comb will be normally maintained with its teeth extending longitudinally on a plane parallel or nearly parallel with the plane of the cutting edge of the cutter for which purpose a stop collar 80 is fixed on the push rod and adapted to abut against the under side of the sleeve 74 to limit upward movement of the rod. It is to be noted that while Figures 2, 4, 11 and 14 of the drawings show the comb as normally arranged with the teeth thereof projecting horizontally, this arrangement may be varied as occasion may require, to normally dispose the comb with the teeth extending at an incline to the horizontal. For example the teeth may be normally disposed in a downwardly inclined position by arranging the stop collar 80 on the push rod at a lower point thereon than here illustrated, whereby the spring 78 acting on the push rod will dispose the comb in a downwardly tilted position. It will be observed that on rocking the yoke to move the comb downwardly away from the cutter a pull will be exerted on the rod 73 so that the comb will be caused to tilt downwardly as illustrated, for example in Figure 12, but when it is desired that the comb assume a horizontal position when moved downwardly relatively to the cutter or to assume an upward inclination as shown in Figure 3, the operator may depress the push rod 73 coincident with exerting an upward pull on the shank 61. It will be observed that any desired positioning of the comb may be effected by the operator during operation of the cutter or independent thereof, as occasion may require, by manipulating the shank 61, lever 68 and push rod 73 either separately or collectively or in combination with each other according to the result to be accomplished. For example, on rocking the yoke by actuating the shank 61 alone, the comb will be moved downwardly away from the cutter, as shown in Figure 12, on operating the lever 68 alone the comb will be projected forwardly in relation to the cutter as shown in Figure 14, on depressing the push rod 73 alone the comb will be tilted upwardly in relation to the cutter, as shown in Figure 13, by operating the shank 61 and lever 68, collectively, the comb will be moved downwardly and projected forwardly with relation to the cutter, as shown in Figure 15, by operating the shank 61 and push rod 73, collectively, the comb will be moved downwardly and tilted upwardly in relation to the cutter, as shown in Figure 17, by operating the lever 68 and push rod 73 collectively, the comb will be projected forwardly and inclined upwardly with relation to the cutter, as shown in Figure 16, and by operating the shank 61, lever 68, and push rod 73, collectively, the comb will be moved downwardly, advanced forwardly, and tilted upwardly in relation to the cutter, as shown in Figure 17. By thus manipulating the comb in relation to the cutter, and varying the stroke of the latter, the operator is enabled to effect the various movements of the comb and cutter as are ordinarily employed in manually operating a pair of shears and a comb in effecting hair cutting operations.

In the embodiments of the invention illustrated in Figures 18 to 24 inclusive, different types of cutters are shown as associated with an adjustable comb, a modification of the comb mounting and its adjusting means is depicted, and another relative arrangement of the cutter and handle is shown. Referring to these figures more particularly 81 indicates a plate carried by the handle A on which is supported the cutter B and the comb C. The plate is fitted with a pair of spaced guideways 82 and 83 in which are mounted for vertical movement a pair of toothed bars 84 and 85 from the lower ends of which project horizontally extending guideways 86 and 87 in which is slidably mounted a bar 88 carrying the comb C. A shaft 89 is journalled in bearings formed on the guideways 82 and 83 and extends longitudinally above the plate 81, and fixed on the shaft are pinions 90 and 91 which mesh with the toothed bars 84 and 85. The outer end of the shaft 89 is fitted with a handle 92 by means of which the shaft and pinions may be manually turned to effect reciprocal movement of the toothed bars whereby the comb C may be raised and lowered into various adjusted positions. Pivotally connected at 93 to the comb carrying bar 88 is a rack bar 94 the outer end portion of which is slidably supported in a rockable yoke 95 pivoted on a rotary shaft 96 extending along the rear edge of the plate 81 and journalled in suitable bearings. A pinion 97 fixed on the shaft meshes with the rack bar 94 and is adapted on rotation of the shaft 96 to effect longitudinal movement of the rack bar 94 and thereby shift the comb carrying bar 88 backward or forward in the guideways 86 and 87. The shaft 96 is fitted with a knurled wheel 98 adapted to be rotated by the thumb or finger of the operator to effect operation of the shaft 96 and its connections. By operating the shafts 89 and 96 the comb may be moved in and out and up and down relatively to the plate 81 and the cutter carried thereon.

In Figure 18 the cutter is shown as comprising a fixed shear blade 26 and an oscillatory shear blade 27; the fixed shear blade being arranged lowermost and extending longitudinally above the comb. The blade 27 is pivoted to the fixed blade at 28 and is connected at its inner end to a link 99 connecting with a crank 100 on a shaft 101 which is adapted to be power driven to effect operation of the shear blade 27.

In Figure 23 the cutter is shown as comprising a longitudinally reciprocal blade 102 formed with a series of cutting teeth 103, which blade and teeth cooperate with a fixed plate 104 having cutting teeth 105 in the manner common in hair clippers; the blade 102 being adapted to be actuated by means of a crank 106 on a drive shaft 107, the crank being connected to the blade 102 by a link 108.

In Figure 24 the cutter is shown as including a rotary cutting element including a cylinder 109 on the periphery of which is mounted spirally arranged cutting blades 110 which are adapted on rotation of the cylinder to cooperate with a series of cutting teeth 111 extending beneath the cylinder to effect a cutting action. The cylinder is fitted with a shaft 112 adapted to be connected to any suitable source of power.

In the operation of the invention, the operator holds the device by the handle and applies suitable motive power to the driving shaft to cause rotation thereof which may be effected and controlled in any desired manner, thereby causing actuation of the cutter. The comb is disposed in any desired position relative to the cutter by manipulation of the comb control mechanism and is advanced through the hair to be cut in such manner that the hair engaged by the comb will be held so as to be subjected to the action of the cutter; the comb being positioned close to the cutter when operating on short hair and being spaced farther from the cutter as the length of the hair being worked increases and according to the results to be accomplished, and the comb being advanced or retracted, or positioned horizontally or at various inclinations according to the character of work being done.

It is to be understood that the manner of carrying the invention into effect is herein specifically set forth to enable those skilled in the art to make and use the same and is to be considered as illustrative and not in a limiting sense; and that various changes may be made in the parts and in their construction and arrangement within the meaning of the terms and scope of the appended claims without departing from the spirit of the invention.

I claim:—

1. In a hair cutting mechanism, a comb, hair cutting shears associated with said comb, power operated mechanism for actuating said shears, and means for varying the length of stroke of said shears, adapted to be operated at will while the shears are operating.

2. In a hair cutting mechanism, a comb, hair cutting shears associated with said comb including a stationary shear member and an oscillatory shear member, means for actuating said oscillatory shear member, and means for varying the length stroke of said shear member operable at will during movement of said shear member.

3. In a hair cutting mechanism, an oscillatory shear member, a link pivotally connected to said shear member, a rotary driving shaft, a crank on said driving shaft, a connecting rod extending between said crank and link, and means engageable with said link whereby rotation of said crank will effect both lateral and longitudinal movement of said link.

4. In a hair cutting mechanism, an oscillatory shear member, a link pivotally connected to said shear member, a rotary driving shaft, a crank on said driving shaft, a connecting rod extending between said crank and link, means engageable with said link whereby rotation of said crank will effect both lateral and longitudinal movement of said link, said means including a pivoted arm formed with an inclined slot, a projection on the link engaged by said slot, and means for rocking said arm to various positions whereby the length of the longitudinal movement of said link may be varied.

5. In a hair cutting mechanism, a power operated cutter, a support therefor, a comb carried by said support and pivoted thereon to rock vertically, a manually controlled push rod for rocking said comb, manually controlled means for moving said comb vertically relative to the support and manually controlled means for moving said comb horizontally relative to the support.

6. In a hair cutting mechanism, a hair cutter, a support therefor, a comb, a back plate carrying said comb, a pair of sleeves on which said back plate is pivoted for vertical rocking movement, a vertically rocking yoke on said support on which said sleeves are pivotally mounted, a rock shaft, and connections between said rock shaft and the sleeves whereby on turning the rock shaft said sleeves may be moved to shift said comb horizontally.

FRANK FEWINS.